(12) United States Patent
Khandekar et al.

(10) Patent No.: US 12,454,640 B2
(45) Date of Patent: Oct. 28, 2025

(54) HYPERBRANCHED CORROSION INHIBITORS

(71) Applicant: Cameron International Corporation, Houston, TX (US)

(72) Inventors: Chandrashekhar Yeshwant Khandekar, Humble, TX (US); Rachael Anne Hughes, Sandnes (NO); Tore Nordvik, Sandnes (NO); Kevin Paul Ramirez, Houston, TX (US); Bastian Sauerer, Houston, TX (US); Alyn Edward Jenkins, Aberdeen (GB)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 18/613,839

(22) Filed: Mar. 22, 2024

(65) Prior Publication Data

US 2024/0318067 A1    Sep. 26, 2024

Related U.S. Application Data

(60) Provisional application No. 63/491,983, filed on Mar. 24, 2023.

(51) Int. Cl.
    *C09K 8/54* (2006.01)
(52) U.S. Cl.
    CPC ............ *C09K 8/54* (2013.01); *C09K 2208/32* (2013.01)

(58) Field of Classification Search
    CPC .............................. C09K 8/54; C08G 83/005
    See application file for complete search history.

(56) References Cited

U.S. PATENT DOCUMENTS

| | | | |
|---|---|---|---|
| 9,796,917 B2 | 10/2017 | Khandekar |
| 10,087,382 B2 | 10/2018 | Nordvik |
| 10,626,317 B2 | 4/2020 | Deshpande |
| 10,655,052 B2 | 5/2020 | Cole |
| 11,180,588 B2 | 11/2021 | Cole |
| 2008/0194761 A1 | 8/2008 | Van Bergen |

FOREIGN PATENT DOCUMENTS

| | | |
|---|---|---|
| CN | 112979944 A | 6/2021 |
| CN | 114044914 A | 2/2022 |
| CN | 114315620 A | 4/2022 |
| GB | 2583618 B | 11/2020 |
| WO | 2017044896 A1 | 3/2017 |
| WO | 2019144086 A1 | 7/2019 |

OTHER PUBLICATIONS

English machine translation of Chu (CN 112979944). (Year: 2021).*

* cited by examiner

*Primary Examiner* — Peter F Godenschwager
(74) *Attorney, Agent, or Firm* — Jeffrey D. Frantz

(57) ABSTRACT

Embodiments described herein provide corrosion inhibitors that use hyperbranched polymer molecules functionalized with amino carboxylic acids, epoxides, and/or long chain fatty acids, or combinations thereof. Nitrogen atoms in such molecules can be quaternized to increase water solubility if needed. Such hyperbranched polymer corrosion inhibitors can be used in all stages of oil and gas operation.

15 Claims, 2 Drawing Sheets

HYPERBRANCHED CORROSION INHIBITORS

CROSS-REFERENCE TO RELATED APPLICATIONS

This patent application claims benefit of U.S. Provisional Patent Application Ser. No. 63/491,983 filed Mar. 24, 2023, which is entirely incorporated herein by reference.

FIELD

This patent application relates to corrosion inhibitors for use in oil and gas applications that have hyperbranched structure. More specifically, this application relates to functionalized hyperbranched molecules that can be used as corrosion inhibitors.

BACKGROUND

Corrosion inhibitors are used in all phases of oil and gas production to prevent or minimize corrosion of metal equipment. Such inhibitors can be used in aqueous mixtures, oil mixtures, or water-oil mixtures in all stages of oil and gas operation such as drilling, completion, production, transportation, surface processing, and storage. Improved and new corrosion inhibitors are always sought for such application.

SUMMARY

Embodiments described herein provide a method, comprising preparing a corrosion inhibitor using a hyperbranched polymer terminated by amino carboxylic acid, ether, polyether, long chain alkyl, or polyamido groups, or a combination thereof; and using the corrosion inhibitor in an oil and gas operation.

Other embodiments described herein provide a method, comprising flowing a produced stream containing hydrocarbon and corrosive species from a well through a pipe; and flowing, into the pipe, a water-based corrosion inhibitor that is a hyperbranched polymer terminated by amino carboxylic acid, ether, polyether, long chain alkyl, or polyamido groups, or a combination thereof.

Other embodiments described herein provide a method, comprising flowing a produced stream containing hydrocarbon and corrosive species from a well through a pipe; and flowing, into the pipe, a water-based corrosion inhibitor that is a hyperbranched polymer having the structure $(NH_2-R^1-e)_m$-POL-$(OH)_{n-m}$, wherein POL is a hyperbranched polymer structure, $R^1$ is an organic group, e is a carboxylate ester linkage, and m and n are integers wherein m≤n.

DETAILED DESCRIPTION

Figure 1:
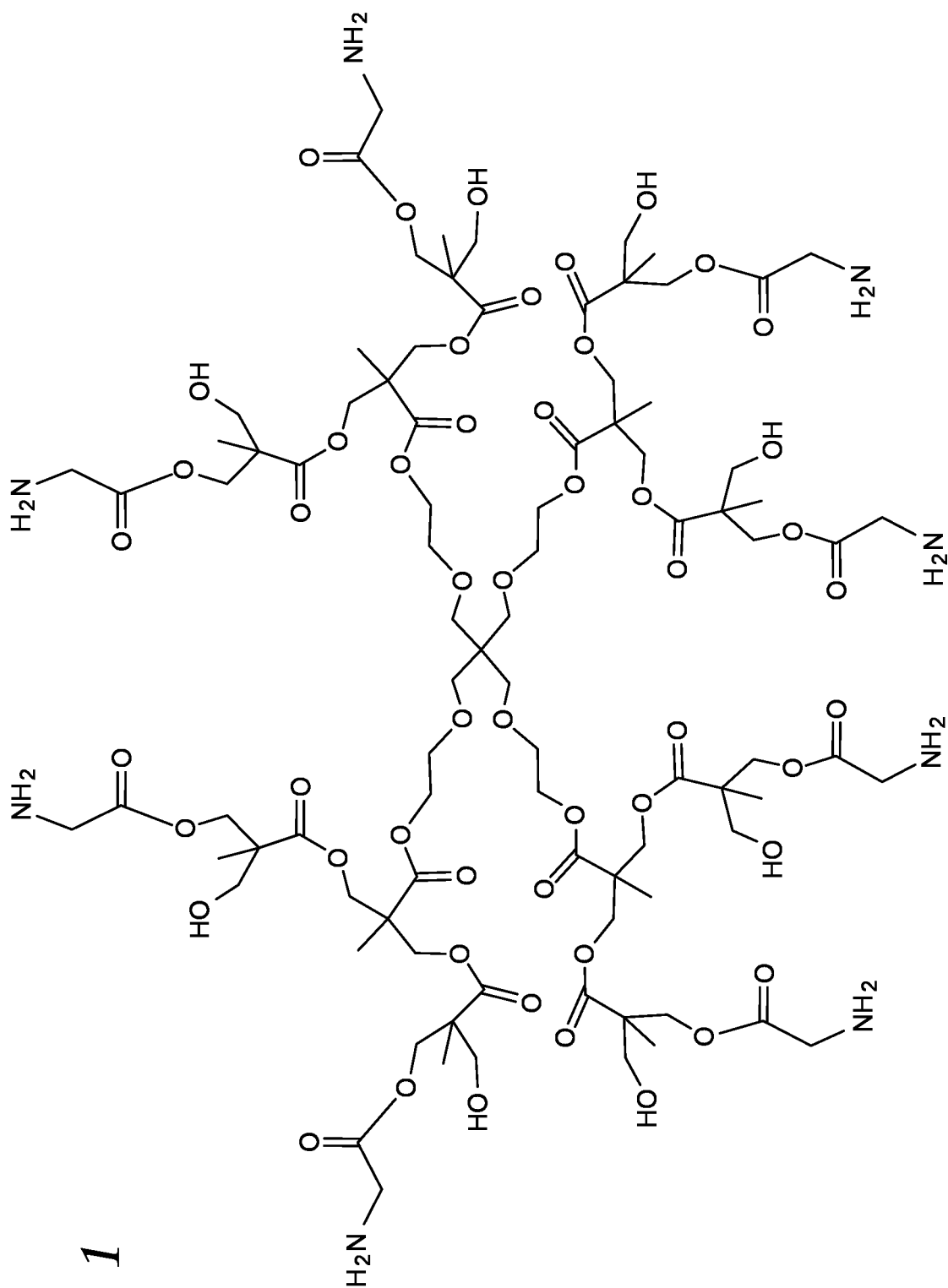
FIG. 1 is a schematic representation of a chemical structure according to one embodiment of a corrosion inhibitor.
Figure 2:
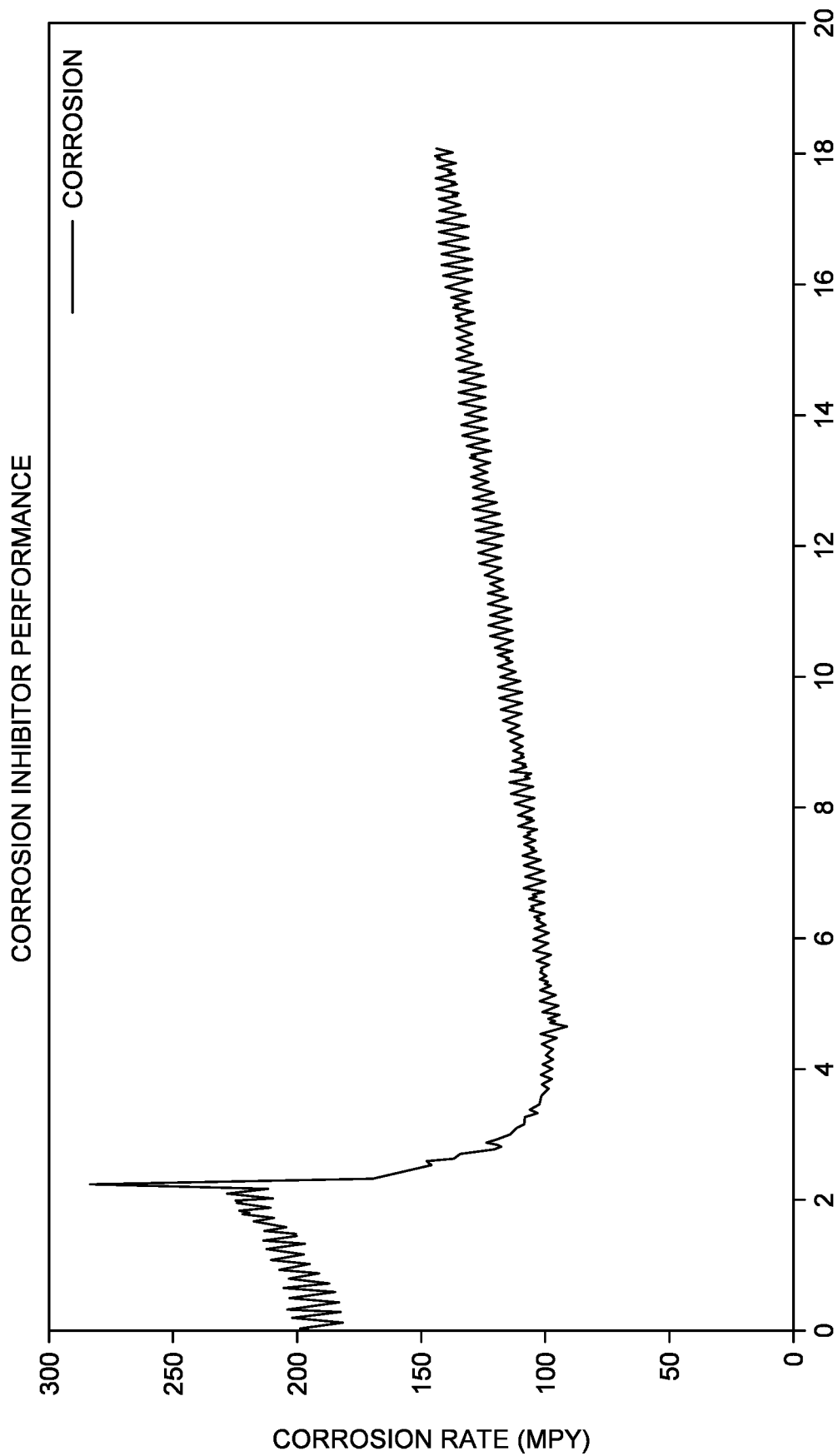
FIG. 2 is a graph showing corrosion resistance performance of a corrosion inhibitor according to one embodiment.

Hyperbranched molecular structures offer good control of molecular properties. Such structures can be used as corrosion inhibitors in oil and gas applications generally requiring management of corrosion, such as drilling, completion, production, transportation, and storage. Certain hyperbranched polymeric structures can be functionalized with specific functional groups to enhance resistance to corrosion. For example, hyperbranched hydroxyl terminated polymers can be functionalized using amino carboxylic acids to yield amino terminated (or amine terminated) hyperbranched polymeric structures. Hyperbranched polymeric structures terminated by hydroxyl or amine groups can be functionalized using fatty acids to yield hyperbranched polymeric structures terminated, or partially terminated, by alkyl structures. Hyperbranched polymeric structures terminated by hydroxyl or amine groups can be functionalized using alkylene oxides to yield hyperbranched polymeric structures terminated, or partially terminated, by polyether groups. Hyperbranched polymeric corrosion inhibitors that are not water soluble can be made water soluble by quaternizing amine structures of the hyperbranched polymer.

Hyperbranched polymeric structures can take the form of dendritic structures, tree-like structures, brush-like structures, and combinations of such structures. Such structures are generally made starting with a multifunctional core molecule or structure and conducting a polymerization reaction to add monomers that react with the functionality of the core structure. The monomers are generally at least difunctional to support a polymerization chain reaction.

The variety of hyperbranched polymeric structures is almost as broad as polymer science itself. Hyperbranched polymeric structures can have terminal hydroxyl groups, as in the generic structure POL-$(OH)_n$, where "POL" denotes a hyperbranched polymeric structure of any sort, and "n" denotes an integer number of hydroxyl groups at the outer extent of the polymeric structure. Examples of such structures include PEGOL dendrimers, PEI networks, alkane diamine dendrimer structures such as poly(amido amine) (PAMAM) structures, polyol brush structures, and hyperbranched polyester structures using molecules such as pentaerythritol, trimethylolpropane, glycerol, and among many others. A species reactive with hydroxyl groups, and providing corrosion inhibiting function, can be reacted with the hyperbranched polymers having terminal hydroxyl groups to yield corrosion inhibiting species having the general structure (G-λ)$_x$-POL-$(OH)_{n-x}$, where POL is as defined above, G is a group from a hydroxyl-reactive species, A is a linking group that is a product of reaction between the hydroxyl-reactive species an a hydroxyl group of the hyperbranched polymer, and x and n are non-zero integers where x≤n. In general, the hydroxyl-reactive species has the general structure G-λ'-H, where λ' becomes A upon reaction of the acidic hydrogen with a hydroxyl group. Such reactions are typically performed in aqueous solution, which may be buffered, and may include use of protecting and deprotecting steps. The reaction can also be performed merely by contact between solid materials such as an amino carboxylic acid salt and a solid hyperbranched hydroxyl-terminated polymer. A ratio of x/n can be called a saturation ratio of the hyperbranched corrosion inhibitor and can have a value from greater than zero to one. The saturation ratio can, thus, be less than one. The saturation ratio defined above may be any average value of a mixture of hyperbranched corrosion inhibitor molecules that all have the same terminal group G, or different terminal groups G, in different amounts relative to the original number of hydroxyl groups of the hyperbranched polymer. Alternately, the reaction to form the hyperbranched corrosion inhibitor can be controlled such that all or substantially all of the hyperbranched corrosion inhibitor molecules have the same saturation ratio.

The terminal hydroxyl groups of such structures can be functionalized to yield hyperbranched polymeric structures terminated by amine groups by reacting the hydroxyl-terminated hyperbranched polymeric structure with one or more amino carboxylic acids. Amino carboxylic acids are organic molecules that have an amine functional group and a carboxylic acid functional group. The acid functionality of the amino carboxylic acid reacts with the terminal hydroxyl groups, in a low pH environment, to add the amino carboxylic acid to the hydroxyl group and form amino ester terminal structures, as in the generic ester structure POL-$(e-R^1-NH_2)_m$, where e is a carboxylate ester linkage, $R^1$ is a linking organic structure of any sort, and m is the number of amino ester terminal structures, where m could be less than or equal to n in the generic hyperbranched polymer structure above. The general reaction, which is a condensation reaction that can take place between solid materials, or in a water or organic solution, or in neat liquid phase, is POL-$(OH)_n$+m(H-e-$R^1$-$NH_2$)→$(NH_2$-$R^1$-e$)_m$-POL-$(OH)_{n-m}$+m$H_2O$, where m, n, $R^1$, and e are as defined above.

Amino carboxylic acids such as glycine, alanine, leucine, phenylalanine, tyrosine, para-amino benzoic acid, lysine, histidine, and arginine can be used. Osmolytes such as sarcosine can also be used. The amino carboxylic acids can be naturally occurring compounds or synthetic compounds, and can be linear, branched, cyclic, bicyclic, polycyclic, aromatic, polynuclear aromatic, or combination thereof in the $R^1$ portion above. The amino carboxylic acids can also include, in the $R^1$ portion above, atoms other than carbon, hydrogen, oxygen, and nitrogen. Any of the proteinogenic amino carboxylic acids generally involved in genetic coding can be used, which in addition to those listed above include asparagine, aspartic acid, cysteine, glutamine, glutamic acid, isoleucine, methionine, proline, serine, threonine, tryptophan, valine, selenocysteine, and pyrrolysine. Non-proteinogenic amino carboxylic acids can also be used. For example, in addition to those listed above, synthetic amino carboxylic acids that can be used include aminobutyric acid, aminolevulinic acid, aminoisobutyric acid, dehydroalanine, aminoheptanoic acid, pipecolic acid, ornithine, and many others. Additionally, amino carboxylic acids having atoms other than carbon, hydrogen, oxygen, and nitrogen, which can be used herein, include lanthionine, djenkolic acid, cystathionine, glutathione, and many others. Amino carboxylic acid molecules containing aromatic and polyaromatic structures can also be used. Derivatives and combinations of the above can also be used. Where a combination of amino carboxylic acids is used, $R^1$ will not be a single linking organic structure, but will be as varied as the variety of amino carboxylic acids used. Thus, it should be noted that the $R^1$ portion of the general structure above can have corrosion inhibiting function that is additional to the corrosion inhibiting function of the terminal amine group.

Dimers and oligomers of amino carboxylic acid molecules (short polyamides) can also be reacted with terminal hydroxyl groups of a hyperbranched polymeric structure to yield amido and polyamido ester end groups. Such molecules have the general structure POL-[a-($R^3$-a)$_q$]$_r$, where a is an amide linkage, $R^3$ is a linking organic structure, q is the number of amide units in a terminal polyamido chain, and r is the number of terminal groups substituted with polyamido chains, which can be less than the total number of available terminal groups. It should be noted that q can be 1, such that the terminal unit is an amido unit, not a polyamido unit, and the chain length can be mixed.

An example of a dendrimer, partially functionalized with glycine, which can be used as a corrosion inhibitor, is shown in FIG. 1. FIG. 1 is a schematic chemical structure representing a corrosion inhibitor according to one embodiment. The dendrimer shown in FIG. 1 has a pentaerythritol core and extends four branches, one from each hydroxyl group of the core. Each branch has two sub-branches, and each sub-branch is terminated by one hydroxyl group and one glycine ester group. Thus, this dendrimer is about 50% functionalized with glycine terminal groups (i.e. saturation ratio of about 0.5). This molecule is an example of the structure $(NH_2$-$R^1$-e$)_m$-POL-$(OH)_{n-m}$ where $R^1$ is —$CH_2$—, n is 16, and m is 8.

Other species that can react with terminal hydroxyl groups of a hyperbranched polymer to yield molecules that can be useful for corrosion inhibition include alkylene oxides, which can support chain reactions to form terminal polyether (polyalkylene oxide) groups at the outer extremity of hyperbranched polymeric structures. Molecules like ethylene oxide and propylene oxide, and other alkylene oxide molecules (like butylene oxide, pentene oxide, styrene oxide, and norbornene oxide), can react with terminal hydroxyl groups of a hyperbranched polymer to form ether-terminated hyperbranched polymers or polyether-terminated hyperbranched polymers that can be used as corrosion inhibitors. These molecules have the general structure POL-[O—($R^2$—O)$_j$—OH]$_k$, where $R^2$ is a linking hydrocarbyl structure, k is the number of terminal ether or polyether structures added to terminal hydroxyl groups of the hyperbranched polymer, and j is the number of alkylene oxide units added to the ether terminus of each hydroxyl group, where j can be different for different hydroxyl groups. In most cases, j will be distributed about some average number indicating an average length of a polyether terminal chain, which will be determined by stoichiometry of the polyether termination reaction. The terminal ether and polyether groups may, themselves, have terminal hydroxyl groups. Other epoxide molecules, such as epichlorohydrin and glycidyl ethers can also be used for this purpose. In such cases, the linking organic structure $R^2$ is the portion of the molecule bonded to the ether-oxygen atoms of the polyether structure. In general, mixtures of epoxide molecules can also be used. In such cases $R^2$, in the formula above, will not be a single linking organic structure but will be as varied as the variety of epoxide molecules used.

It should be noted that alkylene oxides can also be reacted with terminal amine groups to provide terminal amino alcohol groups —$R_xNH_y$—$R^2$—OH, where y is 1 or 0 and x+y=2. The terminal amine groups can be part of a hyperbranched polyamine polymer or can be added to a hyperbranched polymer by functionalization, as described above. Where a hyperbranched polymer has amine and hydroxyl terminal groups, alkylene oxide molecules will react with both types of terminal groups to yield polyether terminal structures. The reaction rates will be different for amine and hydroxyl structures, so the polyether chains may have different lengths. Such molecules would have the general structure POL-[O—($R^2$—O)$_j$—OH]$_k$—[N—($R^2$—O)$_l$—OH]$_m$, where $R^2$ is the linking organic structure of the alkylene oxide, j and l are polymerization extent of the polyether chains extending from oxygen and nitrogen atoms, respectively, of the hyperbranched polymer, and k and m are the respective numbers of oxygen-linked and nitrogen-linked polyether chains.

In general, hyperbranched polymers can be functionalized as described herein to any desired extent, primarily using stoichiometry to limit the degree of attachment to the outer groups of the hyperbranched polymer. Where terminal hydroxyl groups are functionalized using amino carboxylic acids, the number of terminal hydroxyl groups converted to terminal amine groups is controlled by stoichiometry. Generally, converting at least half the terminal hydroxyl groups leads to a useful corrosion inhibitor molecule. Using excess amino carboxylic acid naturally converts all terminal hydroxyl groups of the hyperbranched polymer. Where epoxide molecules are used to convert terminal hydroxyl and/or amine groups, it is preferred to grow terminal polyether chains having a length of at least 3 repeating units (i.e. j is at least 3), such as a length of 3 to 50 repeating units (i.e. j is 3 to 30), or a length of 3 to 30 repeating units (i.e. j is 3 to 30), for example 15 repeating units (i.e. j=3).

The hyperbranched polymer corrosion inhibitors described herein can be used in any phase of an oil and gas production system, on the surface or in subterranean settings, for drilling, completion, production, transportation, storage, surface processing, and the like. Mixtures of the different kinds of polymers described herein can be used. Thus, a corrosion inhibitor composition can use a first hyperbranched polymer terminated by a first species and a second hyperbranched polymer terminated by a second species, wherein the first species and the second species are each any of the terminal species described herein, and the first and second species are different. In general, the corrosion inhibitor is deployed as an aqueous mixture, where the hyperbranched polymer may be dissolved or dispersed. Dissolving the hyperbranched polymer corrosion inhibitor works best, but some of the hyperbranched polymer corrosion inhibitor may not be dissolved in some cases, resulting in a saturated solution and dispersion. These corrosion inhibitors can be injected directly into produced streams or can be mixed with treatment materials to be deployed in a subterranean formation. For example, where a stream produced from a hydrocarbon well flow through steel piping, a solution or dispersion of a hyperbranched polymer corrosion inhibitor can be flowed into the produced stream to reduce or eliminate corrosion of the steel piping that may occur due to action of acid species in the produced stream. Like any corrosion inhibitor, the amount of the corrosion inhibitors described herein to be used to inhibit corrosion in a flowing produced stream depends on the acidity of the flowing stream and the degree of corrosion inhibition desired.

Hyperbranched polymers having terminal amine groups can also be used as corrosion inhibitors. These polymers have the general structure POL-$(NH_2)_n$, where n is the number of amine terminal groups of the hyperbranched polymer. Any of the hyperbranched polymers described herein having amine groups can be made water soluble, or their water solubility can be enhanced, by quaternizing one or more nitrogen atoms in the molecule. A hyperbranched polymer corrosion inhibitor can be added to an acidic solution, such as an aqueous solution of thioglycolic acid, formic, acid, acetic acid, dimethyl sulfate, benzyl chloride, hydrochloric acid, or chloroacetic acid, to quaternize one or more nitrogen atoms of the corrosion inhibitor. In some cases, more than one nitrogen atom in a given amine-containing hyperbranched polymer molecule can be quaternized by exposure to acidic solution. Generally, stoichiometric excess acid will maximize quaternization of nitrogen atoms within a hyperbranched polymer. The acidic solution can be buffered, if desired, and used to add the corrosion inhibitor to a material to be used in an oil and gas operation.

Hyperbranched polymers having hydroxyl or amine terminal groups can also be functionalized to add terminal alkyl chains that can increase oleophilicity of the molecules. Long chain fatty carboxylic acids and di-acids can react with the terminal hydroxyl and/or amine groups to yield respective long chain fatty ester and amide terminal groups to the hyperbranched polymer. For example, hyperbranched polymers can be functionalized with $C_6$ to $C_{24}$, such as $C_{12}$ to $C_{18}$, hydrocarbyl chains, which can be linear or branched. Such species typically have the general structure $(CH_3-(CH_2)_x-e)_m$-POL-$(OH)_{n-m}$, where e, m, and n are as defined above, and x is an integer denoting length of the alkyl chain attached to the hyperbranched polymer core.

Hybrids of the types of hyperbranched corrosion inhibiting polymers described herein can be used. Such polymers can include any combination of amino carboxylic acid termination, polyether termination, long chain alkyl termination, and hydroxyl termination, in any proportions and with any chain lengths within reason. Thus, hyperbranched polymer corrosion inhibitors can be mono-shelled, for example having only amine termination, bi-shelled, for example having amine termination and hydroxyl termination. It should also be noted that protection strategies can be used to protect some terminal groups while other terminal groups are functionalized. One common protection strategy for hydroxyl groups involves the use of silyl ether groups, which can be added via halosilanes and removed by fluoride ions. A common protection strategy for amine groups involves the use of carbamate groups, which can be added via carbonyl halides such as fluorenylmethoxycarbonyl chloride or benzyl chloroformate.

The strategies described above can be used to introduce terminal groups for hyperbranched polymers that are, or contain, structures known to provide corrosion resistance. Such structures include ring structures containing nitrogen, oxygen, sulfur, or any combination thereof, in the ring structure. Amino carboxylic acids having such structures can be used to functionalize a hydroxyl terminated hyperbranched polymer molecule. Five-member ring structures that can be added to a hyperbranched polymer, as part of an amino carboxylic acid functionalizing species, include the structures of pyrrolidine, 2-pyrroline, 3-pyrroline, 1H-pyrroline, 2H-pyrroline, pyrazolidine, imidazolidine, 2-pyrazoline, 2-imidazoline, pyrazole, imidazole, 1,2,3-triazole, 1,2,4-triazole, tetrazole, furan, tetrahydrofuran, 1,3-dioxolane, thiophene, tetrahydrothiophene, oxazole, isoxazole, isothiazole, thiazole, 1,2-oxathiolane, 1,3-oxathiolane, 1,2,5-oxadiazole, 1,2,3-oxadiazole, 1,3,4-thiadiazole, 1,2,5-thiadiazole, sulfolane, 2,4-thiazolidinedione, succinimide, 2-oxazolidone, and hydantoin. Six-member ring structures that can be added to a hyperbranched polymer, as part of any amino carboxylic acid functionalizing species, include the structures of piperidine, pyridine, piperazine, pyridazine, pyrimidine, pyrazine, 1,2,4-triazine, 1,3,5-triazine, tetrahydropyran, 2H-pyran, 4H-pyran, pyrylium, 1,4-dioxane, 1,4-dioxine, thiane, 2H-thiopyran, 4H-thiopyran, 1,3-dithiane, 1,4-dithiane, 1,3,5-trithiane, morpholine, 4H-1,2-oxazine, 2H-1,2-oxazine, 6H-1,2-oxazine, 4H-1,3-oxazine, 2H-1,3-oxazine, 6H-1,3-oxazine, 4H-1,4-oxazine, 1H-1,4-oxazine, thiomorpholine, 4H-1,4-thiazine, 2H-1,2-thiazine, 6H-1,2-thiazine, 2H-1,4-thiazine, cytosine, thymine, uracil, and thiomorpholine dioxide. Carboxylic acid molecules containing the preceding structures can react with terminal hydroxyl groups of a hyperbranched polymer, such as the polymer shown above or any of the hydroxyl terminated polymers described herein, to form hyperbranched polymers having these structures.

It should be noted that some amino carboxylic acids, such as ornithine, can have more than one amine group. Thus, it is possible to react a multi-amine amino carboxylic acid with the hydroxyl groups of a hyperbranched polymer to yield a corrosion inhibitor having more amine groups than original hydroxyl groups. For example, where a hyperbranched polymer has n hydroxyl groups, n moles of ornithine can react with those hydroxyl groups to yield hyperbranched polymers having up to 2n amine groups per molecule. Such amine abundance can be expected to increase corrosion resistance of the resulting molecules.

In one example synthesis, to a three necked round bottom flask equipped with an overhead stirrer, a thermometer, and a vacuum distillation head, 78.8 g (0.014 mol) of Boltorn H-311 and 35.6 g (0.31 mol) of glycine hydrochloride were added. The solid mixture was heated very slowly under vacuum to a temperature range between 12° and 150° C. for four hours, during which time 5.10 g of water were removed. The reaction mass was then cooled down, and a brown solid was recovered which was further analyzed for determination of molecular weight.

Corrosion inhibitor performance testing of the polymer in the brown solid was carried out using linear polarization resistance (LPR), which provides the extent of corrosion resistance of materials in an aqueous environment. In this method, a small voltage (or polarization potential) is applied to an electrode in solution. The current needed to maintain a specific voltage shift (typically 10 mV) is directly related to the corrosion on the surface of the electrode in the solution. By measuring the current, a corrosion rate can be readily derived.

The testing was carried out using a 3% sodium chloride brine, added to a glass vessel equipped with a condenser, a sparge tube, and a thermocouple. The brine was heated to 70° C. and carbon dioxide gas was continuously sparged throughout the test. LPR electrodes, connected to an automatic data logging system were placed in the brine, and the heating was continued for 2 hours during which time the uninhibited corrosion rate was measured continuously. After 2 hours, 100 ppm of the brown solid corrosion inhibitor above was added to the brine as a 25% solution in a-terpineol. Other solvents, such as water or ethylene glycol monobutyl ether can be used to dissolve the corrosion inhibitor polymer, and combinations of solvents can also be used. The polymer can also be purified, if desired, using one or more solvent purification steps. After addition of the solution to the brine, corrosion measurement was continued for 16 hours (total 18 hours), after which a graph of corrosion rate versus time, included here as FIG. 1, was plotted to determine the efficiency of the corrosion inhibitor. The graph of FIG. 1 shows that addition of the corrosion inhibitor made using the procedure above resulted in a clear reduction in corrosion rate during the LPR test.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A method, comprising:
flowing a produced stream containing hydrocarbon and corrosive species from a well through a pipe; and
flowing, into the pipe, a water-based corrosion inhibitor comprising a hyperbranched polymer terminated by amino carboxylic acid, the hyper branched polymer made by a condensation reaction of a hyperbranched polymer having terminal hydroxyl groups.

2. The method of claim 1, wherein the hyperbranched polymer has at least one quaternary nitrogen atom.

3. The method of claim 1, wherein the hyperbranched polymer is a dendrimer.

4. The method of claim 1, wherein the hyperbranched polymer has a dendritic structure, a tree-like structure, a brush-like structure, or a combination of such structures.

5. The method of claim 1, wherein the hyperbranched polymer has a saturation ratio less than one.

6. The method of claim 1, wherein the hyperbranched polymer has more than one type of terminal group.

7. The method of claim 1, wherein the hyperbranched polymer has a core derived from pentaerythritol.

8. The method of claim 1, wherein at least one branch of the hyperbranched polymer is terminated by a proteinogenic amino carboxylic acid.

9. The method of claim 1, wherein at least one branch of the hyperbranched polymer is terminated by a methionine group.

10. The method of claim 1, wherein at least one branch of the hyperbranched polymer is terminated by a glycine group.

11. The method of claim 1, wherein the hyperbranched polymer is terminated by more than one amino carboxylic acid group.

12. The method of claim 1, wherein the hyperbranched polymer comprises a first hyperbranched polymer terminated by a first amino carboxylic acid species and the water-based corrosion inhibitor further comprises a second hyperbranched polymer terminated by a second amino carboxylic acid species, and the first amino carboxylic acid species is different from the second amino carboxylic acid species.

13. A method, comprising:
flowing a produced stream containing hydrocarbon and corrosive species from a well through a pipe; and
flowing, into the pipe, a water-based corrosion inhibitor that is a hyperbranched polymer having a structure $(NH_2-R^1-e)_m\text{-POL-}(OH)_{n-m}$, wherein POL is a hyperbranched polymer structure, $R^1$ is an organic group, e is a carboxylate ester linkage, and m and n are integers wherein m≤n.

14. The method of claim 13, wherein the hyperbranched polymer is a dendrimer.

15. The method of claim 13, wherein the hyperbranched polymer has a dendritic structure, a tree-like structure, a brush-like structure, or a combination of such structures.

* * * * *